(12) United States Patent
Danielsen

(10) Patent No.: US 12,098,698 B2
(45) Date of Patent: Sep. 24, 2024

(54) SYSTEM AND METHOD FOR INSTALLATION OF AN OPEN-SLEEVE ADD-ON DEVICE ON A WIND TURBINE BLADE

(71) Applicant: General Electric Company, Schenectady, NY (US)

(72) Inventor: Darren John Danielsen, Simpsonville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 150 days.

(21) Appl. No.: 17/866,716

(22) Filed: Jul. 18, 2022

(65) Prior Publication Data

US 2024/0018936 A1 Jan. 18, 2024

(51) Int. Cl.
*F03D 1/06* (2006.01)
*F03D 13/10* (2016.01)
*F03D 80/00* (2016.01)

(52) U.S. Cl.
CPC .......... *F03D 1/0675* (2013.01); *F03D 13/10* (2016.05); *F03D 80/00* (2016.05); *F05B 2230/80* (2013.01); *F05B 2260/96* (2013.01)

(58) Field of Classification Search
CPC ...... F03D 1/0675; F03D 13/10; F03D 13/104; F03D 80/50; F03D 80/502; F05B 2230/80; F05B 2260/96
See application file for complete search history.

(56) References Cited

U.S. PATENT DOCUMENTS

| 9,316,202 | B2 | 4/2016 | Bech |
| 10,337,540 | B2 | 7/2019 | Wardropper et al. |
| 11,754,044 | B1 * | 9/2023 | Danielsen ............. F03D 7/0224 |
| | | | 29/889.21 |
| 2012/0301293 | A1 | 11/2012 | Bech |

(Continued)

FOREIGN PATENT DOCUMENTS

| EP | 3795824 A1 | 3/2021 |
| EP | 4027011 A1 | 7/2022 |

(Continued)

OTHER PUBLICATIONS

European Search Report Corresponding to EP23183654 on Nov. 15, 2023.
Co-Pending U.S. Appl. No. 17/743,626 on May 13, 2022.

*Primary Examiner* — Courtney D Heinle
*Assistant Examiner* — Sang K Kim
(74) *Attorney, Agent, or Firm* — Dority & Manning, P.A.

(57) ABSTRACT

A method for installing an add-on device onto a blade of a wind turbine includes configuring a plurality of tag lines to a wrap, the tag lines having a length to extend to a ground location when the add-on device is positioned on the blade. With the rotor, positioning the blade to a first rotated position. The add-on device is located at a desired span-wise location on the blade such that the wrap forms an open-sleeve configuration draped around the leading edge of the blade and span-wise sides of the wrap extend along pressure and suction sides of the blade adjacent a trailing edge of the blade. With the tag lines, the wrap is tensioned against the blade. Attachment devices configured with the wrap are affixed to the trailing edge of the blade.

18 Claims, 7 Drawing Sheets

(56) References Cited

U.S. PATENT DOCUMENTS

2015/0233341 A1* 8/2015 Neumann ................. B66C 1/66
                                                         414/800
2017/0370386 A1* 12/2017 Wardropper ............ F03D 80/00
2021/0079896 A1    3/2021 Herrig et al.

FOREIGN PATENT DOCUMENTS

EP              4027011 B1 * 10/2023 ............. F03D 13/10
WO     WO-2023036391 A1 *  3/2023

* cited by examiner

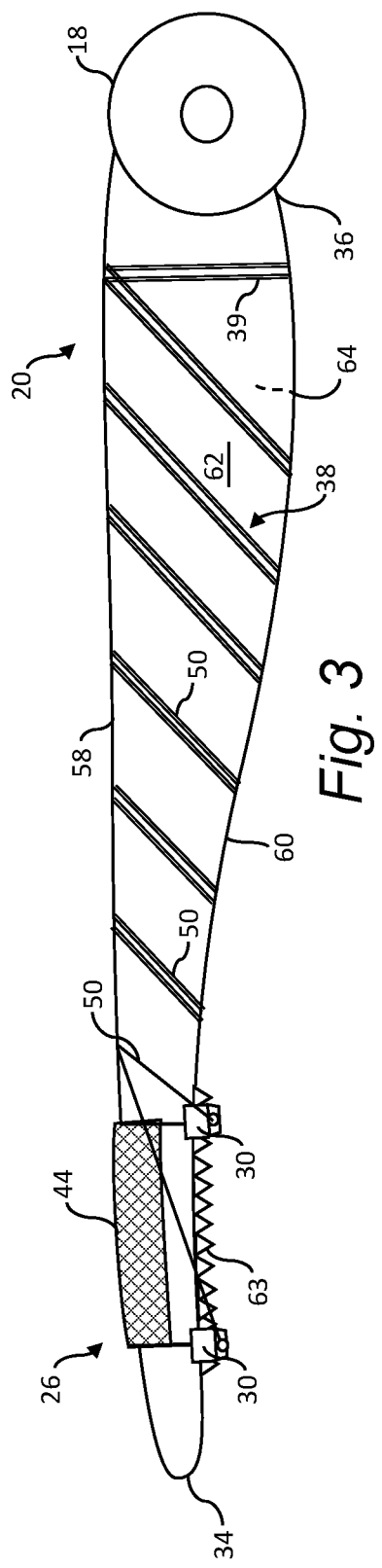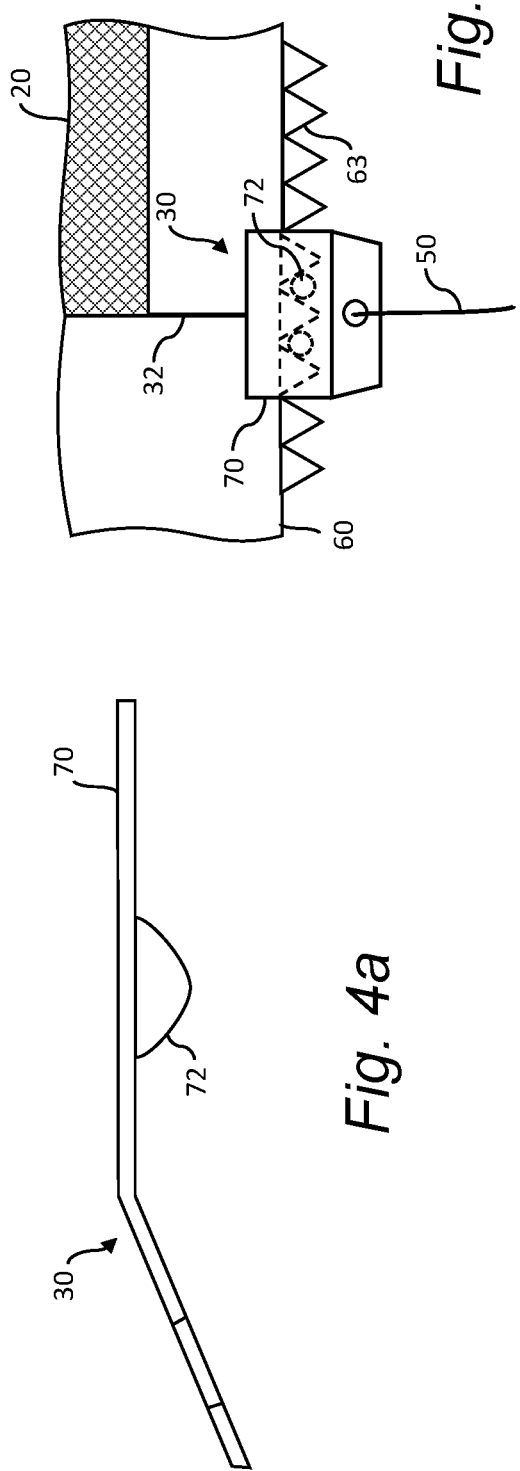

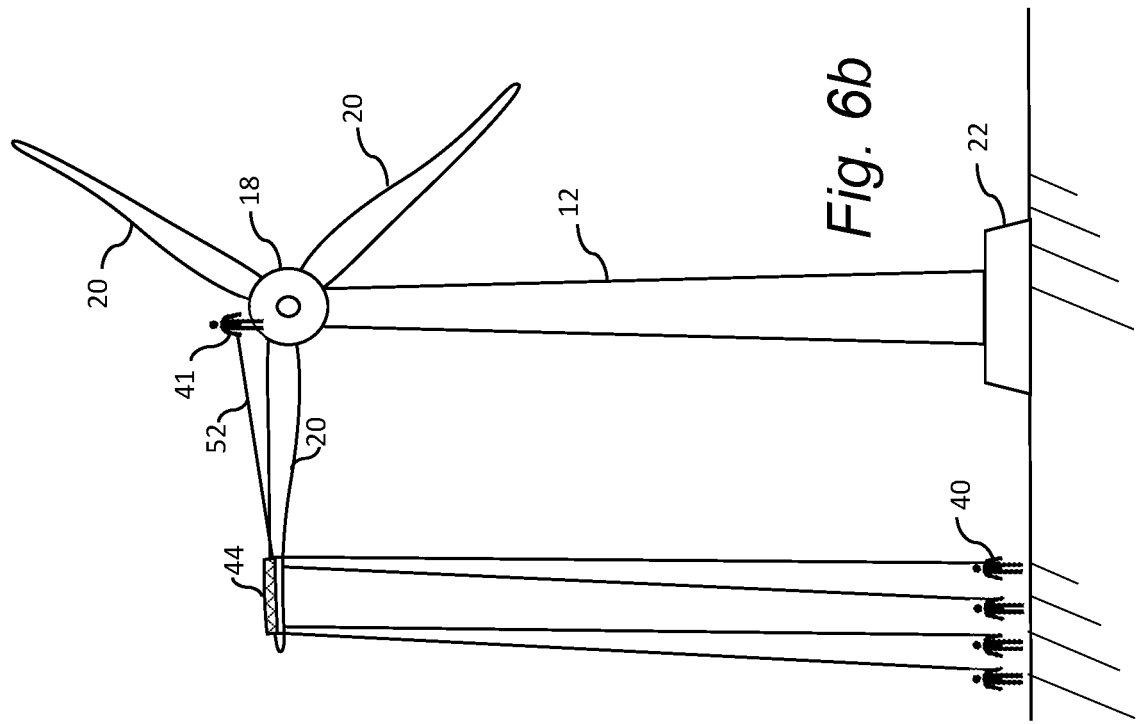
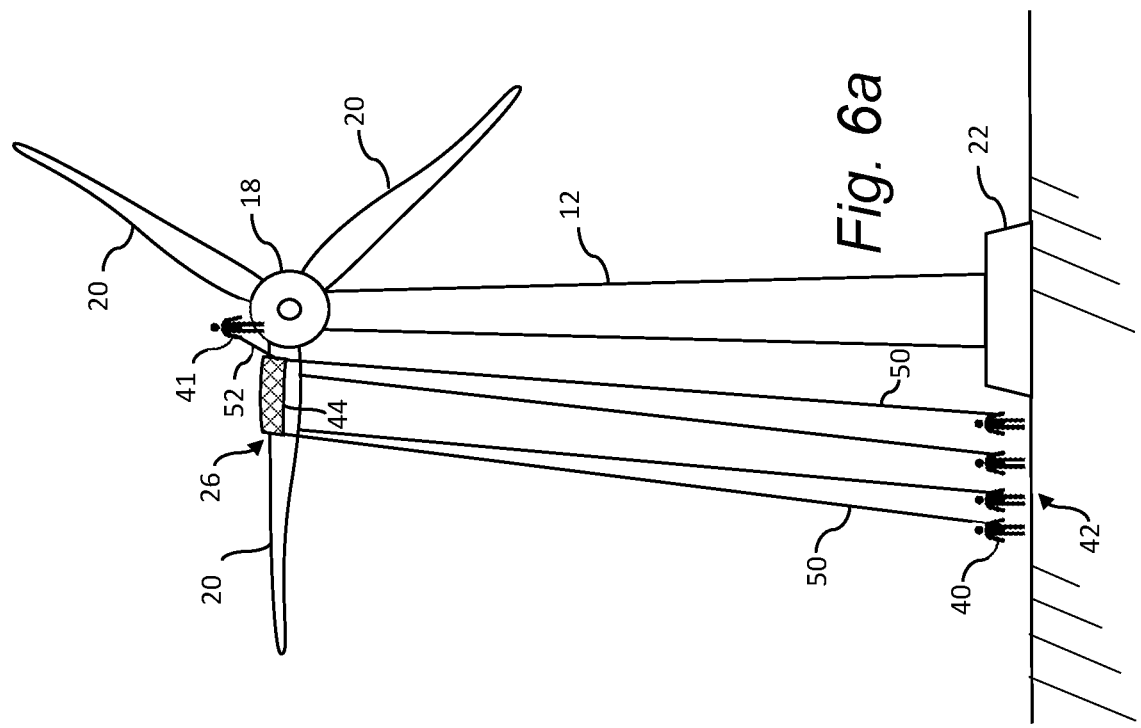

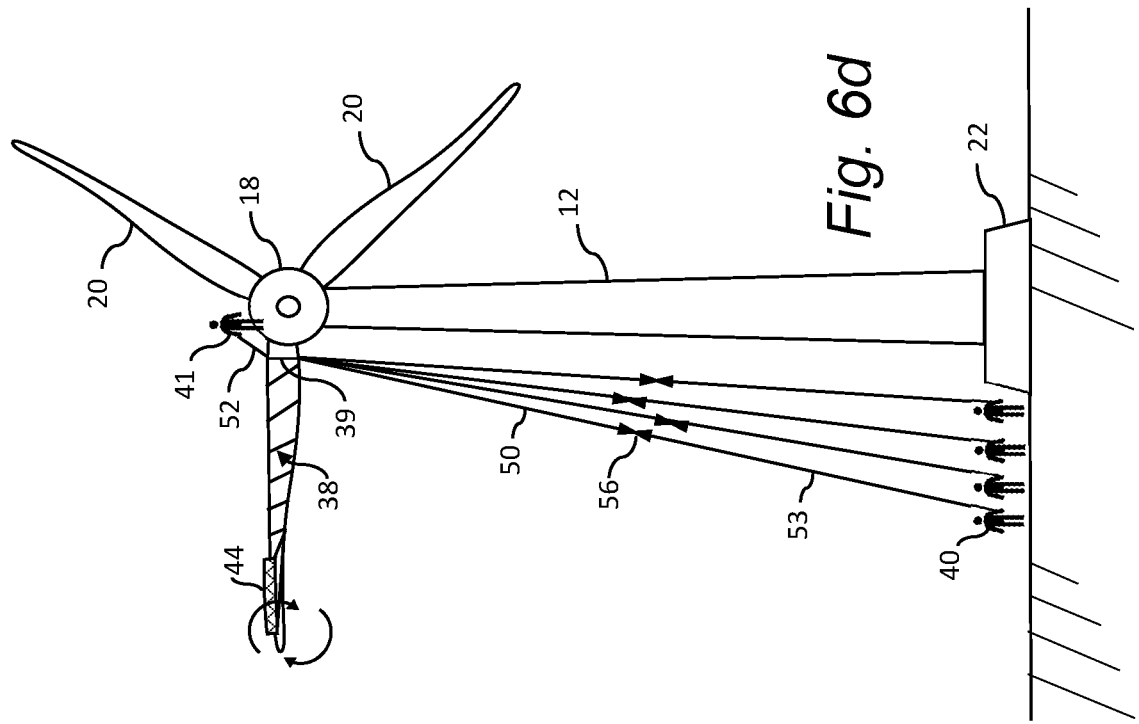
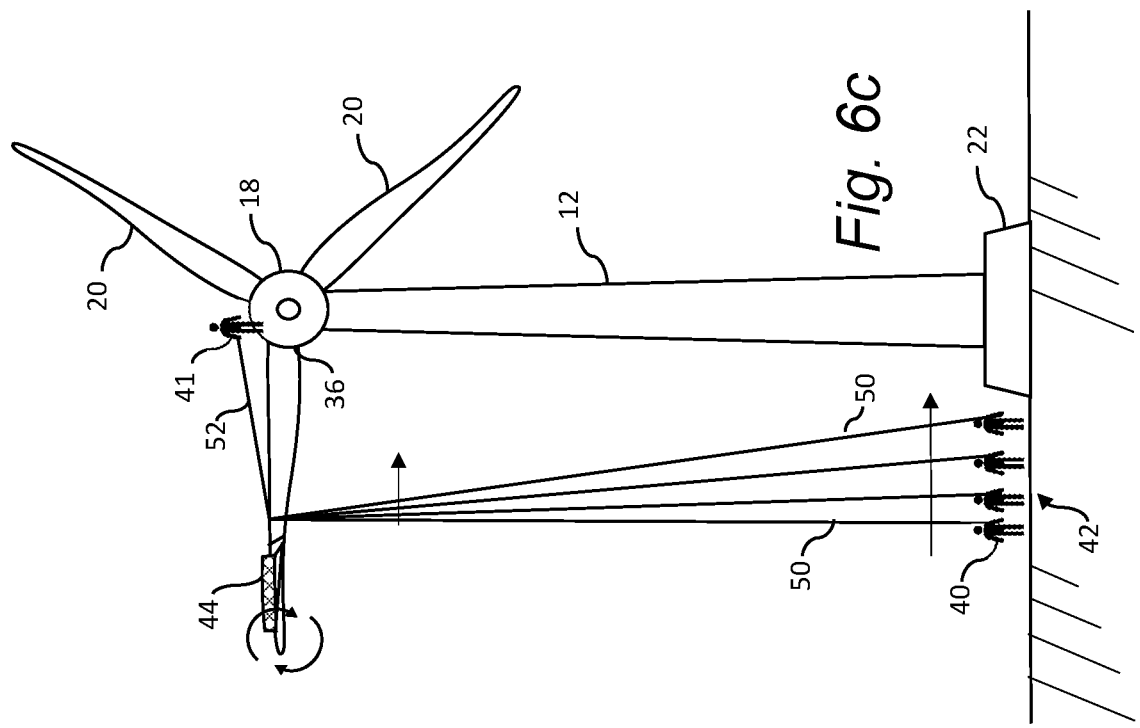

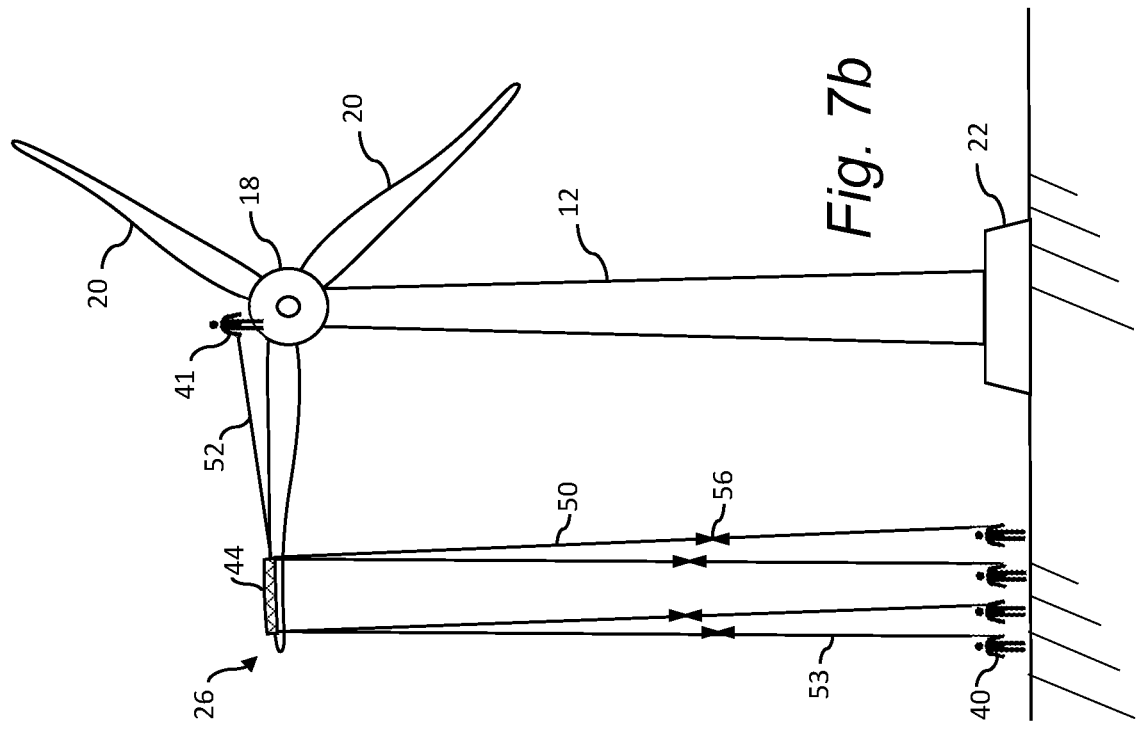
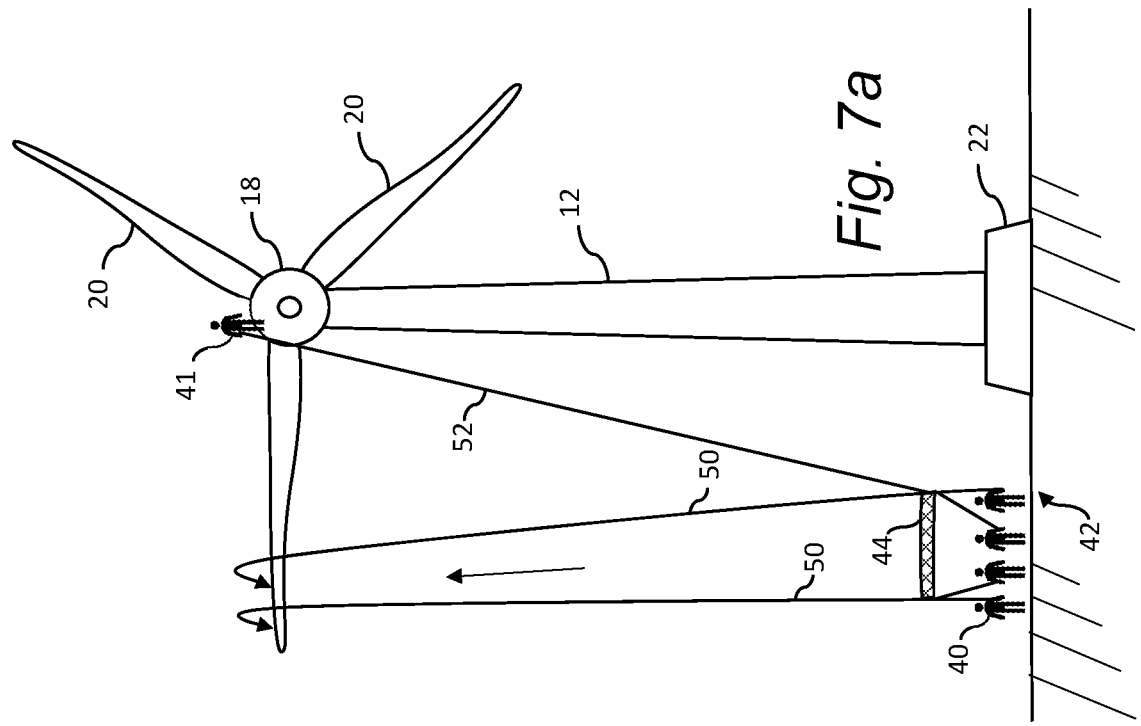

SYSTEM AND METHOD FOR INSTALLATION OF AN OPEN-SLEEVE ADD-ON DEVICE ON A WIND TURBINE BLADE

FIELD

The present subject matter relates generally to wind turbines, and more particularly to methods and related devices for installing an add-on device, such as a vibration suppression device in the form of an open sleeve, onto a wind turbine blade.

BACKGROUND

During installation, maintenance, repair, or other scenarios when the rotor of a wind turbine is either locked or idling, it may be desired to install an add-on device onto the blades of the wind turbine. The add-on device may relate, for example, to a vortex generator or other type of device that is intended to enhance aerodynamic performance of the blade. In a particular scenario wherein the rotor is locked or idling and is without yaw capability, it may be desired to install a temporary add-on device on the blades in the form of a vibration suppression device to prevent stall or vortex induced vibrations from occurring. These vibration suppression devices can range in design, with varying shapes and sizes, and serve to increase drag, disrupt/influence airflow over the blade surfaces, or provide vibration damping.

The current procedures for installing the add-on devices present significant challenges. For example, the conventional solutions generally require a crane, cherry picker, or repelling expertise to install or attach the add-on devices at an uptower location at or near the blade root. These procedures are expensive in terms of necessary equipment (e.g., a crane or cherry picker), time-consuming, and can present health and safety concerns for personnel.

U.S. Pat. No. 10,337,540 describes a device and associated installation method wherein a wind turbine blade oscillation preventer is formed as a closed sleeve with an aperture opening at one end thereof defined by a resilient collar. The preventer is configured for removable application over a tip of the wind turbine blade and extends longitudinally along the blade and peripherally around the blade. The preventer has a non-aerodynamic exterior surface that disrupts smooth or laminar airflow over a substantial portion of the longitudinal and peripheral extent of said sleeve when the preventer is in place on the wind turbine blade. In a particular embodiment, this exterior surface is a fishnet-type of structure. The preventer includes a smooth interior surface extending along the longitudinal extent of sleeve. In use, the smooth interior surface ensures that the blade trailing edge is shielded from contact with the rough non-aerodynamic external surface of the preventer. This ensures that the preventer can be applied to wind turbine blades having serrations at their trailing edge. In particular, the smooth internal surface prevents snagging between the rough non-aerodynamic external surface and the serrations. The smooth internal surface glides over the serrations without engaging them and without damage either to the serration or to the smooth internal fabric.

The method and device of the US '540 patent has distinct disadvantages. For example, the construction of the sleeve is complex and requires an inner smooth layer and an outer fishnet or "rough" non-aerodynamic material layer. In order to keep the blade aperture open during the installation process, a separate resilient collar is required at the aperture. Installation of the sleeve requires rather exact alignment of the open end of the sleeve with the tip of the blade, which requires a particular blade orientation of the blade towards the ground and careful coordination between a technician on the ground with a first guideline and a technician in hub with a second guide line to align the sleeve with the blade tip and pull the sleeve onto the blade tip. It would be desirable to provide a device and associated method for installation of an add-on device, such as a vibration suppression device, onto the tip end of the wind turbine blade that is cost-effective, safe, performed at various orientations of the blade, and eliminates the need for a crane or other similar equipment at the wind turbine site.

BRIEF DESCRIPTION

Aspects and advantages of the invention will be set forth in part in the following description, or may be obvious from the description, or may be learned through practice of the invention.

In one aspect, the present disclosure is directed to a method for installing a pliant material add-on device onto a blade of a wind turbine, wherein the blade is mounted to a rotor at a hub that is atop a tower. The method is not limited to any particular type or purpose of the add-on device, and includes embodiments wherein the add-on device is constructed as a pliant-material wrap that drapes around the leading edge of the wind turbine blade to function as a vibration suppression device that disrupts flow across the blade in order to suppress stall or vortex induced vibrations from occurring. The method includes configuring a plurality of tag lines to the wrap, the tag lines having a length so as to extend to a ground location when the add-on device is secured on the blade. The rotor is used to position the blade to a first rotated position. The add-on device is located to a desired span-wise location on the blade such that the wrap forms an open-sleeve configuration draped around a leading edge of the blade and span-wise sides of the wrap extend along the pressure and suction sides of the blade, respectively, adjacent the trailing edge of the blade. With the tag lines handled by one or more technicians at the ground level location, the wrap is tensioned against the blade. Attachment devices (e.g., clamps, clips, etc.) are configured with the wrap and are affixed to the trailing edge of the blade via the tensioning action.

An embodiment of the method includes wrapping the tag lines around the blade in a direction towards a root end of the blade by rotating the blade with a pitch control system while advancing the tag lines from the ground location towards the root end of the blade. In this manner, the tag lines form a wrap pattern around the blade from the wrap to the root end of the blade.

The trailing edge of the blade at the desired span-wise location of the add-on device may include serrations, wherein the method includes affixing the attachment devices onto, between, or over the serrations so as not to damage the serrations.

In a particular embodiment, the attachment devices are connected to the wrap via elastic members (e.g., an elastic cord or line) and the tag lines are connected to the attachment devices, wherein the tensioning process comprises pulling on the tag lines from the ground location to stretch the elastic members (and tension the wrap against the blade) until the attachment devices engage and affix to the trailing edge of the blade. The wrap may have a rectangular shape and one of the tag lines and attachment devices may be attached to each corner of the wrap.

The first rotated position of the blade may be, for example a relative position between 3 o'clock and 5 o'clock or between 9 o'clock and 7 o'clock.

In a particular embodiment, the add-on device is located at the desired span-wise location on the blade by: with a technician at the rotor hub, positioning the wrap around the leading edge of the blade and dropping the tag lines to the ground location; and with technicians at the ground location, using the tag lines to move the wrap span-wise along the blade to the desired span-wise location. With this embodiment, the technician at the rotor hub may pay out a guideline attached to a chord-wise side of the wrap to stabilize the wrap as the wrap moves along the blade to the desired span-wise location.

In another embodiment, the add-on device is located at the desired span-wise location on the blade by: with one or more technicians at the ground location below the desired span-wise location on the blade, propelling one or more of the tag lines up and over the leading edge of the blade; with the technicians at the ground location, pulling the propelled tag lines to raise the wrap up an over the leading edge of the blade to form the open-sleeve configuration draped around the leading edge; and with the technicians at the ground location, pulling on the tag lines to tension the wrap against the blade and affix the attachment devices to the trailing edge of the blade. With this embodiment, the tag lines and attachment devices may be attached to each of four corners of the wrap, wherein the tag lines attached to the corners at one span-wise side of the wrap are propelled over the blade.

The present invention also encompasses various method embodiments of removing the add-on device from a wind turbine blade in essentially the reverse order in which the add-on device was installed.

The present invention also encompasses an add-on device for a wind turbine, the add-on device including a pliant-material wrap having a size and dimensions so as to form an open-sleeve configuration that drapes around a leading edge of the wind turbine blade at a desired span-wise location along the wind turbine blade, wherein span-wise sides of the wrap extend along pressure and suction sides of the blade, respectively, adjacent a trailing edge of the blade. A plurality of tag lines are attached to the wrap, the tag lines having a length so as to extend from the desired location of the add-on device on the wind turbine blade to a ground location so that technicians at the ground location can handle the tag lines to locate the add-on device at the desired location on the blade. Attachment devices are connected to the wrap, the attachment devices configured to secure the wrap to a trailing edge of the blade.

The trailing edge of the blade at the desired span-wise location of the add-on device may include serrations, wherein the attachment devices are configured to attach onto, between, or over the serrations without damaging the serrations.

In a particular embodiment, the attachment devices include a body with one or more protrusions on a side thereof that fit between the serrations along the trailing edge. The body may be a relatively flat, planar member wherein the protrusions are defined on an underside thereof.

In another embodiment, the attachment device may include a generally U-shaped body member with internal molded surfaces conforming to the shape of the serrations, wherein the serrations slide into the body upon fixing the attachment device to the trailing edge of the blade.

In a certain embodiment, the attachment devices are attached to the wrap via elastic members and the tag lines are attached to the attachment devices, the elastic members having a length so as to tension the wrap against the blade when the attachment devise are affixed to the trailing edge. In this embodiment, the elastic members may extend completely along and beyond the chord-wise sides of the wrap.

The wrap may have a generally rectangular shape, wherein one of the tag lines and clamp devices is attached to each corner of the wrap.

A particular embodiment of the add-on device includes a guideline attached to a chord-wise side of the wrap, the guideline having a length to allow a technician at a rotor hub of the wind turbine to handle the guideline as the add-on device is moved span-wise to the desired location on the blade.

In a unique embodiment, the wrap is formed from an open weave construction or material, for example a fishnet material.

The present invention also encompasses the wind turbine blades having one or more of the add-on devices installed thereon.

The invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 3 is a view of the add-on device of FIG. 2 configured on a wind turbine blade;

FIGS. 4a and 4b are views of an embodiment of an attachment device for use with an add-on device;

FIGS. 6a through 6d are sequential views of a method for configuring an add-on device onto a wind turbine blade; and FIGS. 7a through 7b are sequential views of an alternative method for configuring an add-on device onto a wind turbine blade.

DETAILED DESCRIPTION

Figure 1:
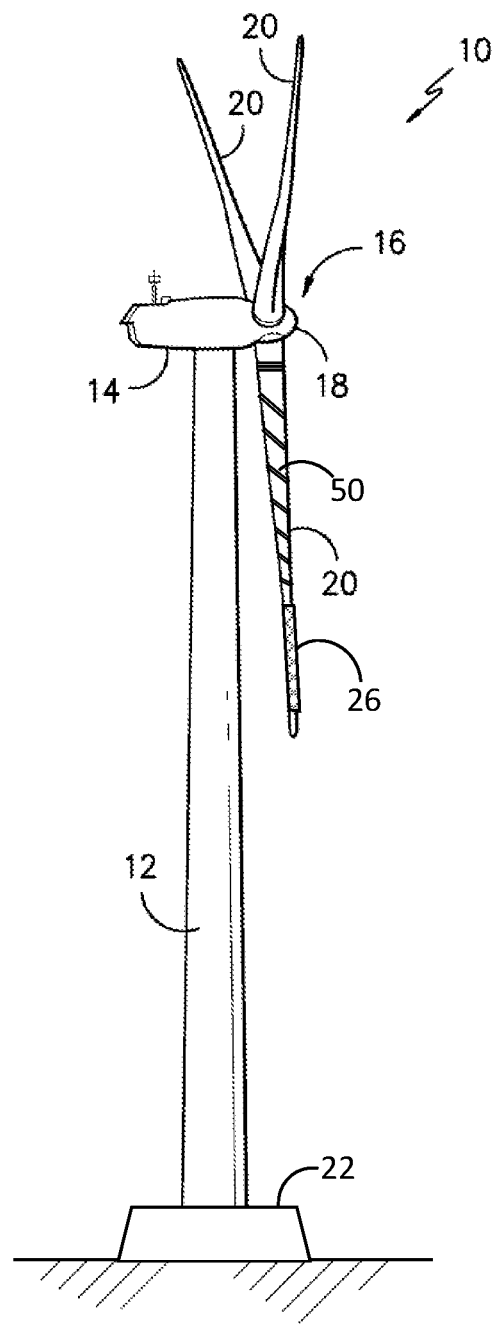
FIG. 1 illustrates a perspective view of a wind turbine with a blade configured with an add-on device in accordance with aspects of the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of an embodiment of a wind turbine 10 with one of its blades 20 configured with an add-on device 26 according to the present disclosure. As shown, the wind turbine 10 generally includes a tower 12 with a ground-level base 22, a nacelle 14 mounted on the tower 12, and a rotor 16 coupled to the nacelle 14. The rotor 16 includes a rotatable hub 18 and rotor blades 20 coupled to and extending outwardly from the hub 18. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotationally coupled to an electric generator positioned within the nacelle 14 to permit electrical energy to be produced.

For purposes of the present disclosure, the term "nacelle" is used herein to include machine head components (e.g., drive train components, generator, etc.) located within the nacelle housing and the hub 18 components.

The add-on device 26 depicted on one of the blades in FIG. 1 may serve different purposes and have varying designs. For example, the add-one device 26 may be designed as a device intended to remain on the blade during operation to enhance aerodynamic performance of the blade. Alternatively, the add-on device may be designed as a temporary device intended to minimize vibrations in the blade during a non-operational condition of the wind turbine, for example when the rotor 16 is in a locked or idling state, or when the rotor cannot be yawed. It should be appreciated that the present invention is not limited to the type or purpose of the add-on device 26. For purposes of explanation only, the add-on device 26 is depicted and described herein as a vibration suppression device intended to suppress or damp vibrations in the blades 20.

The present disclosure is directed to various method embodiments for installing the add-on device 26 onto one or more blades 20 of the wind turbine 10 generally adjacent to the blade tip 34. The method may also be used for installing the add-on device along any span-wise portion of the blade 20.

The shape, size, and configuration of the add-on device can vary within the scope of the invention. A particular embodiment of an add-on device 26 in depicted in FIG. 2 and includes a pliant-material wrap 44 that drapes around the leading edge 58 of the wind turbine blade 20 to function as a vibration suppression device that disrupts flow across the blade 20 in order to suppress stall or vortex induced vibrations from occurring. In this regard, the wrap 44 may have a surface texture that is designed to disrupt airflow across the blade 20. In a unique embodiment, the wrap 44 is formed from an open weave construction or material, for example a fishnet material, as depicted in the figures in general. The wrap 44 may have a generally rectangular shape, as depicted in FIG. 2.

The wrap 44 has a size and dimensions so as to form an open-sleeve configuration that drapes around the leading edge 58 of the wind turbine blade (FIG. 3) at a desired span-wise location along the wind turbine blade 20. Span-wise sides 46 of the wrap 46 extend along pressure 62 and suction 64 sides of the blade 20, respectively, adjacent the trailing edge 60 of the blade 20.

Figure 2:
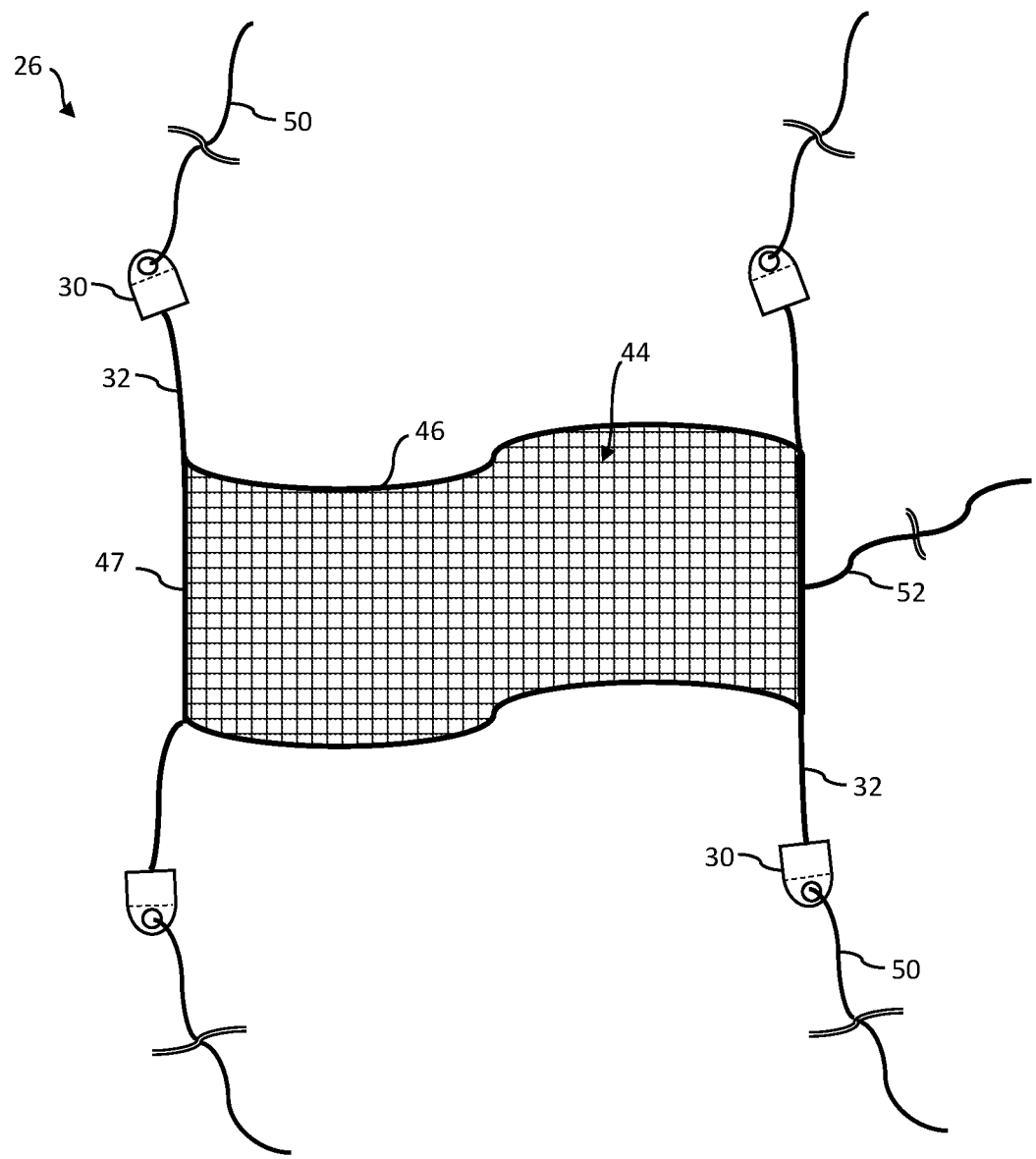
FIG. 2 is a view of an embodiment of add-on device.

The add-on device 26 includes a plurality of tag lines 50 attached to the wrap 44, for example at each corner of the wrap 44 (FIG. 2). The tag lines 50 may be any type of rope, cord, cable, etc., and have a length so as to extend from the desired location of the add-on device 26 on the wind turbine blade 20 to a ground-level location 44, as explained in more detail below with respect to FIGS. 6a-6d.

The add-on device 26 includes a plurality of attachment devices 30 connected to the wrap 44. These devices 30 may be variously configured and serve to secure the wrap 44 to the trailing edge 60 of the blade. The attachment device 30 may be any manner of mechanical clamp, clip, or the like, that releasably affixes to the trailing edge 60. In the various embodiments depicted in the figures, the attachment devices 30 are attached to the wrap 44 via elastic members 32 (e.g., an elastic cord or rope, bungee, or the like), wherein the tag lines 50 are, in turn, attached to the attachment devices 30. The elastic members 32 have a length so as to tension the wrap 44 against the blade surfaces, 62, 64 when the attachment devise 30 are affixed to the trailing edge 60. Referring to FIG. 2, in a particular embodiment, the elastic members 32 may extend completely along and beyond the chord-wise sides 47 of the wrap 44.

Referring to FIG. 3, certain designs of wind turbine blades 20 include serrations 63 along a span-wise portion of the blade trailing edge 60. These serrations 63 provide an enhanced aerodynamic performance from the blade 20. The serrations 63 are typically located along the trailing edge 60 closer to the blade tip 34, which may also coincide with the desired span-wise location of the add-on device 26 on the blade 20. In this case, the attachment devices 30 may be specifically configured to attach onto, between, or over the serrations 63 without damaging the serrations. For example, referring to FIGS. 4a and 4b, in a particular embodiment, the attachment devices 30 may be designed as a clamp having a body 70, which may be a relatively flat, planar, member with one or more protrusions 72 on an underside thereof, the protrusions 72 having a shape and size so as to between the serrations 63 along the trailing edge 60. With this embodiment, due to the elasticity of the elastic member 32, the attachment device 30 is initially pulled (via the tag line 50) beyond the trailing edge 60 so that the protrusions 72 can enter between the serrations 63. Upon release of tension on the tag line 50, the elastic member 32 pulls the body 70 back towards the wrap 40 causing the protrusions 72 to engage between the serrations 63 while the body lies generally flat against the serrations 63 across the trailing edge 60 and onto the pressure or suction side of the blade 20.

Figure 5A:
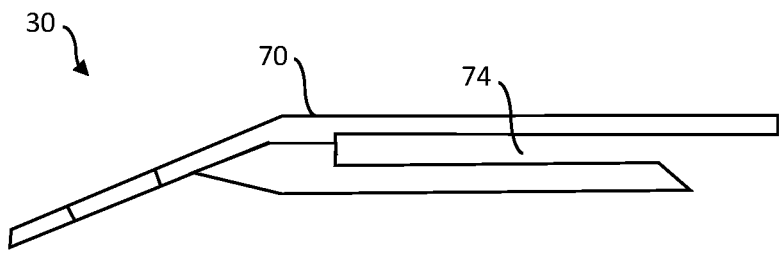
FIGS. 5a and 5b are views of an alternate embodiment of an attachment device for use with an add-on device.
Figure 5B:
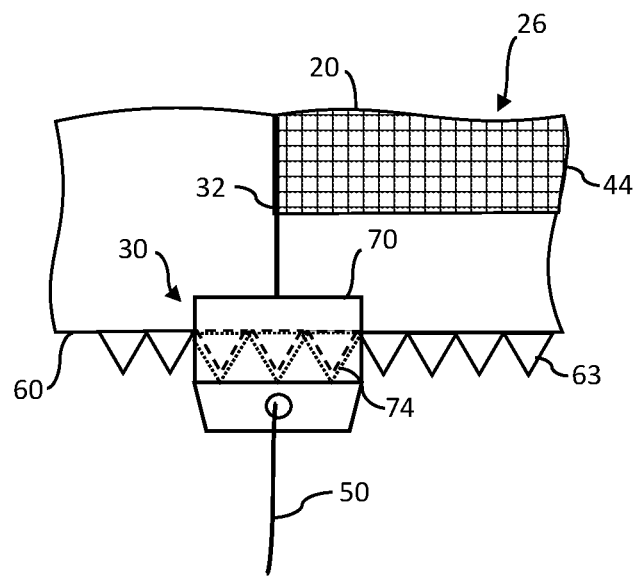

In another embodiment depicted in FIGS. 5a and 5b, the attachment device may include a generally U-shaped body member 70 with internal molded surfaces defining a recess or cavity 74 that conforms to the shape of the serrations 63. The cavity 74 may be a generally open space in which the serrations 63 reside or, in the depicted embodiment, individual cavities 74 are formed to conform to the shape of individual serrations 63. The attachment device 30 is engaged with the trailing edge in the same manner discussed above with respect to the embodiment of FIG. 4a and 48. The body 70 is initially pulled beyond the trailing edge 60 at least to the extent that the entrance to the cavity 74 is past the serrations 63. Upon release of the tag line 50, the elastic member 32 pulls the body 70 back towards the wrap 40 causing the serrations 63 to slide into the cavity 74.

As depicted in FIG. 2, a particular embodiment of the add-on device 26 may include a guideline 52 attached to a chord-wise side 47 of the wrap 44. As explained below in greater detail, the guideline 52 has a length to allow a technician at the 18 rotor hub of the wind turbine to handle the guideline 52 as the add-on device 26 is moved span-wise to the desired location on the blade 20.

Aspects of the method for locating and securing the add-on device 26 onto a blade 20 of a wind turbine 10 are discussed with reference to FIGS. 6a-6d.

The method includes configuring a plurality of the tag lines 50 to the wrap 44. This step may be done by a technician 41 positioned at the rotor hub 18, wherein the tag lines 50 can then be dropped from the hub 18 to other technicians 40 at the ground location 42. As mentioned, the tag lines 50 have a length so as to extend to a ground location 42 when the add-on device 26 is being positioned and secured on the blade 20.

The method includes rotating the rotor 16 (and thus, the hub 18) to locate the blade 20 to a first position desired for the installation process. In FIG. 6*a*, for example, the blade 20 is positioned essentially horizontal to ground (i.e., at the 3 o'clock or 9 o'clock position). In other embodiments, this first rotated position of the blade may be between 3 o'clock and 5 o'clock or between 9 o'clock and 7 o'clock.

The add-on device 26 is then located to the desired span-wise location on the blade 20 such that the wrap 44 forms an open-sleeve configuration draped around the leading edge 58 of the blade 20 and the span-wise sides 46 of the wrap 44 extend along the pressure 62 and suction 64 sides of the blade, respectively, adjacent the trailing edge 60 of the blade (FIG. 3). The wrap 44 is initially positioned around leading edge 58 by the technician 41 at the rotor hub 18, wherein the technician 41 then drops the tag lines 50 to the ground location 42. The technicians 40 at the ground location 42 grab and use the tag lines 50 to walk the wrap 44 span-wise along the blade 20 to the desired span-wise location, as depicted in FIG. 6*b*. With this embodiment, the technician 41 at the rotor hub 18 may pay out the guideline 52 attached to a chord-wise side 47 of the wrap 44 to stabilize the wrap 44 as it moves along the blade 20 to the desired span-wise location.

Referring to FIG. 6*b*, once the wrap 44 has been located on the blade 20, the technicians 40 pull the tag lines 50 to tension the wrap 44 against the blade and to pull the attachment devices into engagement with the trailing edge 60 of the blade 20 as discussed above.

Referring to FIGS. 6*c* and 6*d*, once the wrap 44 has been affixed to the blade via the attachment devices 30, the method may include wrapping the tag lines around the blade 20 in a direction towards a root end 36 of the blade 20 by rotating the blade 20 with a pitch control system (indicated by the rotating arrows in FIG. 6*c*) while the ground technicians 40 advance (e.g., walk) the tag lines 50 towards the root end 36 of the blade 20. This action causes the tag lines 50 to wrap around the blade in a first wrap pattern 38. After completion of the first wrap pattern 38 at the tip end 34 of the blade 20, it may be desired to form one or more chord-wise wraps 39 at or near the root end 36 of the blade 20. This may be done by orienting the tag lines generally perpendicular to a span-wise axis of the blade 20 while rotating the blade with the pitch control system to create the chord-wise wraps 39.

Referring to FIG. 6*d*, various embodiments of the method may include attaching a lead or extension line 53 to and end of the tag lines 50 via any suitable releasable connection device 56, such as a quick-release mechanical device. These lines have a length so as to be paid out from the ground level position 42 while the tag lines 50 wrap around the blade 20. The extension lines 53 may be controlled by the technicians 40 at the ground level position 42 proximate to the tower base 22 until the entire length of the tag lines are wrapped around and secured to the blade 20. The extension lines 53 can be disconnected from the ends of the tag lines 50 by the technician 41 at the rotor hub 18 and allowed to fall to ground.

The present invention also encompasses various methods for uninstalling the add in device 26 (the wrap 44 and tag lines 50) from the blade 20 in an essentially reverse procedure. For removing the add-on device 26, the extension lines 50 can be reattached to the ends of the tag lines 50 by the technician 41 at the hub 18, and the add-on device 26 can be removed by reversing the process described above.

FIGS. 7*a* and 7*b* depict an alternate embodiment for locating the add-on device 26 at the desired span-wise location on the blade 20. The one or more technicians 40 are located at the ground location 42 below the desired span-wise location on the blade 20. The technicians 40 propel (e.g., throw, shoot, etc.) the taglines 50 up and over the leading edge of the blade 20. Extension lines 53 may be attached to each of the tag lines 50, as discussed above. The technicians 40 pull the propelled tag lines 50 (or extension lines 53) to raise the wrap 44 up an over the leading edge of the blade 20 to form the open-sleeve configuration draped around the leading edge. The technicians 40 then pull on all of the tag lines 50 to tension the wrap 44 against the blade 20 and affix the attachment devices 30 to the trailing edge of the blade 20, as discussed above. With this embodiment (as well as the embodiment of FIGS. 6*a*-6*d*), the tag lines 50 and attachment devices 30 may be attached to each of four corners of the wrap 44, wherein the tag lines 50 attached to the corners at one span-wise side 46 of the wrap 44 are propelled over the blade 20.

The present invention also encompasses the individual wind turbine blades blades having one or more of the add-on devices 26 wrapped therearound, as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1: A method for installing an add-on device onto a blade of a wind turbine, wherein the blade is mounted to a rotor at a hub that is atop a tower, the add-on device including a pliant-material wrap that drapes around a leading edge of the blade, the method comprising: configuring a plurality of tag lines to the wrap, the tag lines having a length so as to extend to a ground location when the add-on device is positioned on the blade; with the rotor, positioning the blade to a first rotated position; locating the add-on device at a desired span-wise location on the blade such that the wrap forms an open-sleeve configuration draped around the leading edge of the blade and span-wise sides of the wrap extend along pressure and suction sides of the blade, respectively, adjacent a trailing edge of the blade; with the tag lines, tensioning the wrap against the blade; and affixing attachment devices configured with the wrap to the trailing edge of the blade.

Clause 2: The method according to clause 1, further comprising wrapping the tag lines around the blade in a direction towards a root end of the blade by rotating the blade with a pitch control system while advancing the tag lines from the ground location towards the root end of the blade.

Clause 3: The method according to one of clauses 1-2, wherein the trailing edge of the blade at the desired span-wise location of the add-on device includes serrations, comprising affixing the attachment device onto, between, or over the serrations so as not to damage the serrations.

Clause 4: The method according to one of clauses 1-3, wherein the attachment devices are connected to the wrap via elastic members and the tag lines are connected to the attachment devices, and wherein the tensioning process comprises pulling on the tag lines from the ground location to stretch the elastic members until the attachment devices engage and affix to the trailing edge of the blade.

Clause 5: The method according to one of clauses 1-4, wherein one of the tag lines and attachment devices is attached to each corner of the wrap.

Clause 6: The method according to one of clauses 1-5, wherein the first rotated position of the blade is a relative position between 3 o'clock and 5 o'clock or between 9 o'clock and 7 o'clock.

Clause 7: The method according to one of clauses 1-6, wherein the add-on device is located at the desired span-wise location by: with a technician at the rotor hub, positioning the wrap around the leading edge of the blade and dropping the tag lines to the ground location; and with technicians at the ground location, using the tag lines to move the wrap span-wise along the blade to the desired span-wise location.

Clause 8: The method according to one of clauses 1-7, wherein the technician at the rotor hub pays out a guideline attached to a chord-wise side of the wrap to stabilize the wrap as the wrap moves along the blade to the desired span-wise location.

Clause 9: The method according to one of clauses 1-6, wherein the add-on device is located at the desired span-wise location by: with one or more technicians at the ground location below the desired span-wise location on the blade, propelling one or more of the tag lines up and over the leading edge of the blade; with the technicians at the ground location, pulling the propelled tag lines to raise the wrap up an over the leading edge of the blade to form the open-sleeve configuration wrapped around the leading edge; and with the technicians at the ground location, pulling on the tag lines to tension the wrap against the blade and affix the attachment devices to the trailing edge of the blade.

Clause 10: The method according to one of clauses 1-9, wherein one of the tag lines and attachment devices is attached to each of four corners of the wrap, wherein the tag lines attached to the corners at one span-wise side of the wrap are propelled over the blade.

Clause 11: A wind turbine blade add-on device, comprising: a pliant-material wrap having a size and dimensions so as to form an open-sleeve configuration that drapes around a leading edge of the wind turbine blade at a desired span-wise location along the wind turbine blade, wherein span-wise sides of the wrap extend along pressure and suction sides of the blade, respectively, adjacent a trailing edge of the blade; a plurality of tag lines attached to the wrap, the tag lines having a length so as to extend from the desired location of the add-on device on the wind turbine blade to a ground location so that technicians at the ground location can handle the tag lines to locate the add-on device at the desired location on the blade; and attachment devices connected to the wrap, the attachment devices configured to secure the wrap to a trailing edge of the blade.

Clause 12: The wind turbine blade add-on device according to clause 11, wherein the trailing edge of the blade at the desired span-wise location of the add-on device includes serrations, the attachment devices configured to attach onto, between, or over the serrations without damaging the serrations.

Clause 13: The wind turbine blade add-on device according to one of clauses 11-12, wherein the attachment devices comprise a body with one or more protrusions on a side thereof that fit between the serrations along the trailing edge.

Clause 14: The wind turbine blade add-on device according to one of clauses 11-13, wherein the attachment devices comprise a body with an internal molded surface into which the serrations along the trailing edge fit.

Clause 15: The wind turbine blade add-on device according to one of clauses 11-14, wherein the attachment devices are attached to the wrap via elastic members and the tag lines are attached to the attachment devices, the elastic members having a length so as to tension the wrap against the blade when the attachment devise are affixed to the trailing edge.

Clause 16: The wind turbine blade add-on device according to one of clauses 11-15, wherein the elastic members extend completely along and beyond chord-wise sides of the wrap.

Clause 17: The wind turbine blade add-on device according to one of clauses 11-16, wherein the wrap comprises a rectangular shape and one of the tag lines and clamp devices is attached to each corner of the wrap.

Clause 18: The wind turbine blade add-on device according to one of clauses 11-17, further comprising a guideline attached to a chord-wise side of the wrap, the guideline having a length to allow a technician at a rotor hub of the wind turbine to handle the guideline as the add-on device is moved span-wise to the desired location on the blade.

Clause 19: The wind turbine blade add-on device according to one of clauses 11-18, wherein the wrap comprises an open weave construction.

Clause 20: The wind turbine blade add-on device according to one of clauses 11-19, wherein the open weave construction comprises a fishnet material.

What is claimed is:

1. A method for installing an add-on device onto a blade of a wind turbine, wherein the blade is mounted to a rotor at a hub that is atop a tower, the add-on device including a pliant-material wrap that drapes around a leading edge of the blade, the method comprising:
   configuring a plurality of tag lines to the wrap, the tag lines having a length so as to extend to a ground location when the add-on device is positioned on the blade;
   with the rotor, positioning the blade to a first rotated position;
   locating the add-on device at a desired span-wise location on the blade such that the wrap forms an open-sleeve configuration draped around the leading edge of the blade and span-wise sides of the wrap extend along pressure and suction sides of the blade, respectively, adjacent a trailing edge of the blade;
   with the tag lines, tensioning the wrap against the blade;
   affixing attachment devices configured with the wrap to the trailing edge of the blade; and
   wrapping the tag lines around the blade in a direction towards a root end of the blade by rotating the blade with a pitch control system while advancing the tag lines from the ground location towards the root end of the blade.

2. The method according to claim 1, wherein the trailing edge of the blade at the desired span-wise location of the add-on device includes serrations, comprising affixing the attachment device onto, between, or over the serrations so as not to damage the serrations.

3. The method according to claim 2, wherein the attachment devices are connected to the wrap via elastic members and the tag lines are connected to the attachment devices, and wherein the tensioning process comprises pulling on the tag lines from the ground location to stretch the elastic members until the attachment devices engage and affix to the trailing edge of the blade.

4. The method according to claim 1, wherein one of the tag lines and attachment devices is attached to each corner of the wrap.

5. The method according to claim 1, wherein the first rotated position of the blade is a relative position between 3 o'clock and 5 o'clock or between 9 o'clock and 7 o'clock.

6. A method for installing an add-on device onto a blade of a wind turbine, wherein the blade is mounted to a rotor at a hub that is atop a tower, the add-on device including a pliant-material wrap that drapes around a leading edge of the blade, the method comprising:
 configuring a plurality of tag lines to the wrap, the tag lines having a length so as to extend to a ground location when the add-on device is positioned on the blade;
 with the rotor, positioning the blade to a first rotated position;
 locating the add-on device at a desired span-wise location on the blade such that the wrap forms an open-sleeve configuration draped around the leading edge of the blade and span-wise sides of the wrap extend along pressure and suction sides of the blade, respectively, adjacent a trailing edge of the blade;
 with the tag lines, tensioning the wrap against the blade;
 affixing attachment devices configured with the wrap to the trailing edge of the blade; and
 wherein the add-on device is located at the desired span-wise location by:
  with a technician at the rotor hub, positioning the wrap around the leading edge of the blade and dropping the tag lines to the ground location; and
  with technicians at the ground location, using the tag lines to move the wrap span-wise along the blade to the desired span-wise location.

7. The method according to claim 6, wherein the technician at the rotor hub pays out a guideline attached to a chord-wise side of the wrap to stabilize the wrap as the wrap moves along the blade to the desired span-wise location.

8. A method for installing an add-on device onto a blade of a wind turbine, wherein the blade is mounted to a rotor at a hub that is atop a tower, the add-on device including a pliant-material wrap that drapes around a leading edge of the blade, the method comprising:
 configuring a plurality of tag lines to the wrap, the tag lines having a length so as to extend to a ground location when the add-on device is positioned on the blade;
 with the rotor, positioning the blade to a first rotated position;
 locating the add-on device at a desired span-wise location on the blade such that the wrap forms an open-sleeve configuration draped around the leading edge of the blade and span-wise sides of the wrap extend along pressure and suction sides of the blade, respectively, adjacent a trailing edge of the blade;
 with the tag lines, tensioning the wrap against the blade;
 affixing attachment devices configured with the wrap to the trailing edge of the blade; and
 wherein the add-on device is located at the desired span-wise location by:
  with one or more technicians at the ground location below the desired span-wise location on the blade, propelling one or more of the tag lines up and over the leading edge of the blade;
  with the technicians at the ground location, pulling the propelled tag lines to raise the wrap up an over the leading edge of the blade to form the open-sleeve configuration wrapped around the leading edge; and
  with the technicians at the ground location, pulling on the tag lines to tension the wrap against the blade and affix the attachment devices to the trailing edge of the blade.

9. The method according to claim 8, wherein one of the tag lines and attachment devices is attached to each of four corners of the wrap, wherein the tag lines attached to the corners at one span-wise side of the wrap are propelled over the blade.

10. A wind turbine blade add-on device, comprising:
 a pliant-material wrap having a size and dimensions so as to form an open-sleeve configuration that drapes around a leading edge of the wind turbine blade at a desired span-wise location along the wind turbine blade, wherein span-wise sides of the wrap extend along pressure and suction sides of the blade, respectively, adjacent a trailing edge of the blade;
 a plurality of tag lines attached to the wrap, the tag lines having a length so as to extend from the desired location of the add-on device on the wind turbine blade to a ground location so that technicians at the ground location can handle the tag lines to locate the add-on device at the desired location on the blade;
 attachment devices connected to the wrap, the attachment devices configured to secure the wrap to a trailing edge of the blade; and
 wherein the attachment devices are attached to the wrap via elastic members and the tag lines are attached to the attachment devices, the elastic members having a length so as to tension the wrap against the blade when the attachment devise are affixed to the trailing edge.

11. The wind turbine blade add-on device according to claim 10, wherein the trailing edge of the blade at the desired span-wise location of the add-on device includes serrations, the attachment devices configured to attach onto, between, or over the serrations without damaging the serrations.

12. The wind turbine blade add-on device according to claim 11, wherein the attachment devices comprise a body with an internal molded surface into which the serrations along the trailing edge fit.

13. The wind turbine blade add-on device according to claim 10, wherein the elastic members extend completely along and beyond chord-wise sides of the wrap.

14. The wind turbine blade add-on device according to claim 10, wherein the wrap comprises a rectangular shape and one of the tag lines and clamp devices is attached to each corner of the wrap.

15. The wind turbine blade add-on device according to claim 10, wherein the wrap comprises an open weave construction.

16. The wind turbine blade add-on device according to claim 15, wherein the open weave construction comprises a fishnet material.

17. A wind turbine blade add-on device, comprising:
 a pliant-material wrap having a size and dimensions so as to form an open-sleeve configuration that drapes around a leading edge of the wind turbine blade at a desired span-wise location along the wind turbine blade, wherein span-wise sides of the wrap extend along pressure and suction sides of the blade, respectively, adjacent a trailing edge of the blade;
 a plurality of tag lines attached to the wrap, the tag lines having a length so as to extend from the desired location of the add-on device on the wind turbine blade to a ground location so that technicians at the ground location can handle the tag lines to locate the add-on device at the desired location on the blade;

attachment devices connected to the wrap, the attachment devices configured to secure the wrap to a trailing edge of the blade;

the trailing edge of the blade at the desired span-wise location of the add-on device including serrations, the attachment devices configured to attach onto, between, or over the serrations without damaging the serrations; and wherein the attachment devices comprise a body with one or more protrusions on a side thereof that fit between the serrations along the trailing edge.

18. A wind turbine blade add-on device, comprising:

a pliant-material wrap having a size and dimensions so as to form an open-sleeve configuration that drapes around a leading edge of the wind turbine blade at a desired span-wise location along the wind turbine blade, wherein span-wise sides of the wrap extend along pressure and suction sides of the blade, respectively, adjacent a trailing edge of the blade;

a plurality of tag lines attached to the wrap, the tag lines having a length so as to extend from the desired location of the add-on device on the wind turbine blade to a ground location so that technicians at the ground location can handle the tag lines to locate the add-on device at the desired location on the blade;

attachment devices connected to the wrap, the attachment devices configured to secure the wrap to a trailing edge of the blade; and further comprising a guideline attached to a chord-wise side of the wrap, the guideline having a length to allow a technician at a rotor hub of the wind turbine to handle the guideline as the add-on device is moved span-wise to the desired location on the blade.

* * * * *